(12) United States Patent
Lei

(10) Patent No.: US 6,272,180 B1
(45) Date of Patent: Aug. 7, 2001

(54) COMPRESSION AND DECOMPRESSION OF REFERENCE FRAMES IN A VIDEO DECODER

(75) Inventor: Shaw-Min Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/295,233

(22) Filed: Apr. 19, 1999

Related U.S. Application Data

(63) Continuation-in-part of application No. 08/975,922, filed on Nov. 21, 1997, now Pat. No. 6,130,911.

(51) Int. Cl.[7] ................................................ H04N 7/36
(52) U.S. Cl. .............................. 375/240.16; 375/240.18
(58) Field of Search ....................... 375/240.16, 240.18, 375/240.12; 348/409.1, 413.1, 416.1; H04N 7/36

(56) References Cited

U.S. PATENT DOCUMENTS

| | | | |
|---|---|---|---|
| 5,262,854 | 11/1993 | Ng | 375/240.24 |
| 5,436,666 | 7/1995 | Astle | 375/240.16 |
| 5,526,295 | 6/1996 | Astle | 708/203 |
| 5,539,664 | 7/1996 | Haghighi | 345/557 |
| 5,585,852 | 12/1996 | Agarwal | 375/240.11 |
| 5,614,952 | 3/1997 | Boyce et al. | 375/240.01 |
| 5,635,985 | 6/1997 | Boyce et al. | 375/240.15 |
| 5,646,686 | 7/1997 | Pearlstein | 375/240.05 |
| 5,680,129 | 10/1997 | Weinberger et al. | 341/65 |
| 5,764,374 | 6/1998 | Seroussi et al. | 341/65 |
| 5,767,907 | 6/1998 | Pearlstein | 375/240.05 |
| 5,777,677 | 7/1998 | Linzer et al. | 375/240.11 |
| 5,808,683 | 9/1998 | Tong et al. | 375/240.11 |
| 5,818,530 | 10/1998 | Canfield et al. | 375/240.08 |
| 5,825,424 | 10/1998 | Canfield et al. | 348/445 |
| 6,130,911 | * 10/2000 | Lei | 375/240.16 |

FOREIGN PATENT DOCUMENTS

| | | |
|---|---|---|
| 0794673A2 | 9/1996 | (EP) . |
| 0778709A1 | 6/1997 | (EP) . |
| 0782345A2 | 7/1997 | (EP) . |
| 0794673A2 | 9/1997 | (EP) . |
| 0794675A2 | 9/1997 | (EP) . |
| 0961494A1 | 12/1999 | (EP) . |
| 0687111A2 | 12/1995 | (FR) . |
| 2310101A | 8/1997 | (GB) . |
| WO97/36376 | 10/1997 | (WO) . |

OTHER PUBLICATIONS

Franco Lotti, Bruno Aiazzi, Stefano Baronti and Andrea Casini, "Content–Driven Pyramid Compression of Medical Images for Error–Free Archival and Progressive Transmission," May–Jun. 1995, pp. 301–310.

"An SDTV Decoder with HDTV Capability: An All–Format ATV Decoder", by Larry Pearlstein, John Henderson and Jill Boyce, pp. 422–434.

(List continued on next page.)

*Primary Examiner*—Howard Britton
(74) *Attorney, Agent, or Firm*—Marger Johnson & McCollom, P.C.

(57) ABSTRACT

Methods and apparatus for compressing and decompressing reference frames in a video decoder present a low-complexity approach to conserving reference frame memory. At the same time, this approach provides PSNR and drift-reduction performance comparable to competing methods of relatively high-complexity, allowing typical compression rates of 2:1 to 8:1 to be used with good performance. In a preferred embodiment, reference frames are blocked, and each block is Haar wavelet transformed. The subbands of the wavelet transform with similar expected bit-level run-length statistics are grouped together, and each group is embedded coded using Golomb-Rice codes with a parameter look-up adaption method. The embedded code is stored in a compressed frame memory, indexed by block, for later retrieval and decompression when the reference block is needed by the video decoder.

24 Claims, 7 Drawing Sheets

OTHER PUBLICATIONS

"A New, Fast and Efficient Image Codec Based on Set Partitioning in Hierarchical Trees", by Amir Said and William A. Pearlman, *IEEE*, vol. 6, No. 3, Jun. 1996, pp. 243–250.

"MPEG: A Video Compression Standard for Multimedia Applications", by Didier Le Gall, *Communications of the ACM*, vol. 34, No. 4, Apr. 1991, pp. 47–58.

"HDTV Down–Conversion Decoder", by Jay Bao, Huifang Sun and Tommy C. Poon, *IEEE*, 1996, pp. 100–101.

"Compressing Still and Moving Images with Wavelets", by Michael L. Hilton, Bjorn D. Jawerth and Ayan Sengupta, *Multimedia Systems*, vol. 2, No. 3, Apr. 18, 1994, pp. 1–20.

"Sequential Scaler Quantization of Color Images", by Raja Balasubramanian, Charles A. Bouman and Jan P. Allebach, *Journal of Electronic Imaging*, vol. 3(1), Jan. 1994, pp. 45–59.

"A Low–Complexity Modeling Approach for Embedded Coding of Wavelet Coeffecients", by Erik Ordentlich, Marcelo Weinberger and Gadiel Seroussi, pp. 1–10.

"Method and Apparatus for Reducing Memory Requirements In an Interframe Video Codec" by Shaw–Min Lei, Mar. 4, 1999, pp. 1–7.

"Core Experiments on Macroblock–Partitioning for Motion Prediction (P2)", by Takahiro Fukuhara, Kohtaro Asai and Tsuyoshi Kasahara, pp. 1–17.

"Core Experiments on STFM/LTFM for Motion Prediction (P3)", by Takahiro Fukuhara, Kohtaro Asai and Tsuyoshi Kasahara, pp. 1–17.

"Core Experiment S2 VOP Coding Using Sprites: Geometrical Transformation of Sprite Objects", Samsung AIT, pp. 96–109.

"Result of N3 Experiment Using Unified S2/N3 Syntax", by Regis J. Crinon, Dean Messing and M. Ibrahim Sezan, Nov. 1996, pp. 1–11.

"Results for Video Coding using Dynamic Sprite (Core Experiment N3)", by Frederic Dufaux, Nov. 1996, pp. 1–14.

"LOCO–I: A Low Complexity, Context–Based, Lossless Image Compression Algorithm", by Marcelo J. Weinberger, Gadiel Seroussi and Guillermo Sapiro, pp. 1–11.

"Optimal Source Codes for Geometrically Distributed Integer Alphabets", by Robert G. Gallager and David C. Van Voorhis, *IEEE*, Mar. 1975, pp. 228–230.

"Run–Length Encodings", by Solomon W. Golomb, Nov. 9, 1965, pp. 399–401.

"Coding of Still Pictures", by Dr. Daniel T. Lee, *ISO/IEC*, Jan. 25, 1998, pp. 1–82.

* cited by examiner

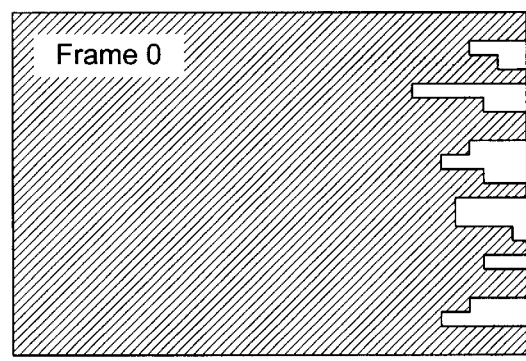
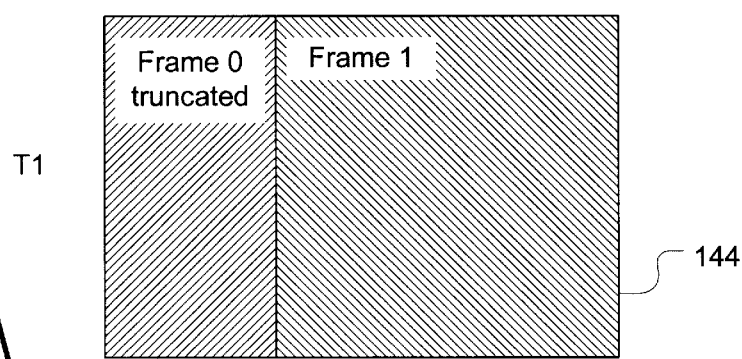
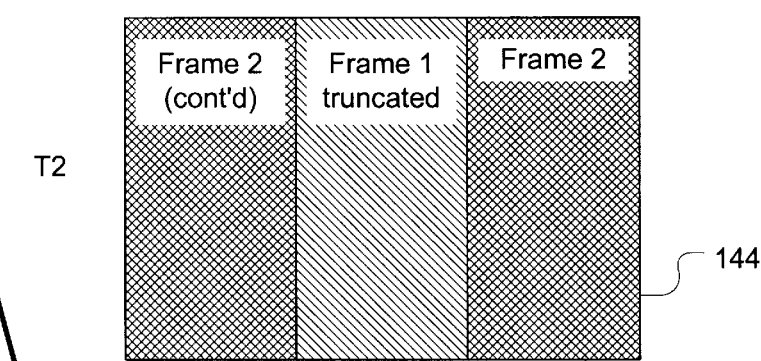
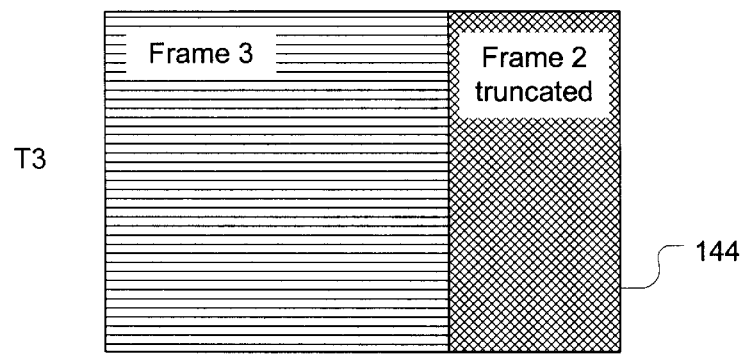
Fig. 11

COMPRESSION AND DECOMPRESSION OF REFERENCE FRAMES IN A VIDEO DECODER

RELATED APPLICATIONS

This application is a continuation-in-part of copending U.S. patent application Ser. No. 08/975,922, filed Nov. 21, 1997, now U.S. Pat. No. 6,130,911, by Shaw-Min Lei, and entitled "Method and Apparatus for Compressing Reference Frames in an Interframe Video Codec". U.S. patent application Ser. No. 08/975,922 is incorporated by reference herein, in its entirety.

FIELD OF THE INVENTION

This present invention relates to the transmission and storage of images, and in particular, to interframe video encoding and decoding.

BACKGROUND OF THE INVENTION

In video compression technology, interframe coding (e.g. motion predictive coding) is most often used to remove temporal redundancy in the video sequence. For example, the most popular video coding standards, including H.261, MPEG-1, MPEG-2, H.263, and the new MPEG4 standard, all use motion predictive coding to remove temporal redundancy. In order to facilitate interframe decoding, frame memory is usually required to store a reference frame(s) (e.g., a previous frame). The cost of this frame memory can be a very significant part of a digital video decoder, especially for higher-resolution video. By far, the memory cost predominates in the cost of an HDTV MPEG-2 decoder.

Many researchers have attempted to reduce the memory requirements for reference frame storage. Generally, these methods require that the reference frames be compressed prior to storage in the decoder frame memory and then decompressed when they are needed to perform interframe decoding. Thus the common elements of systems implementing these methods are an image compressor, a compressed image storage memory, and an image decompressor.

The earliest such systems simply downsampled the reference frames prior to storage. For instance, U.S. Pat. No. 5,614,952 proposes that reference frames be either subsampled at a lower resolution, or that pixel values be truncated to a lower precision. U.S. Pat. No. 5,825,424 implements this method in a configurable processor that can be used in different configurations with different amounts of memory. Systems such as these are relatively low in complexity, but tend to suffer greatly from drift. Drift typically manifests itself as visible temporal cycling in reconstructed picture quality, due to the errors introduced in interframe decoding by throwing away part of the reference information during downsampling.

Later systems added complexity in an attempt to combat drift. U.S. Pat. No. 5,777,677 proposes Hadamard transforming a reference frame and quantizing the transform to achieve compression. European Patent Application 0,794,673 A2 proposes multiplying image blocks by a one-dimensional "Harr" transform matrix and quantizing the product to achieve compression. U.S. Pat. No. 5,680,129 codes pixel values directly with a predictive coder. European Patent Application 0,778,709 A1 codes pixel values directly with an adaptive pulse-code modulation technique. And European Patent Application 0,687,111 A2 compresses reference frames using an MPEG-like approach with a DCT, quantizer, and variable-length coder.

SUMMARY OF THE INVENTION

In U.S. patent application Ser. No. 08/975,922, I proposed a method having relatively low complexity and low drift, using a Haar block-based two-dimensional wavelet transform followed by compression using the Set Partitioning In Heirarchical Trees (SPIHT) algorithm. For details on the SPIHT algorithm, see Said and Pearlman, "A New, Fast, and Efficient Image Codec Based on Set Partitioning in Hierarchical Trees," Trans. On Circuits and Systems for Video Technology, Vol. 6, No. 3, pp. 243–250, Jun. 1996. The present disclosure includes a further improvement on this idea, one that simplifies compression and decompression, and is more suitable for hardware implementation.

The SPIHT algorithm and other similar embedded coding techniques achieve compression by exploiting the hierarchical and contextual redundancies present in a wavelet transform coefficient array. The present invention avoids the complexity of these methods while achieving similar performance. The present invention recognizes, for the first time, that the bit planes of a relatively small wavelet transform coefficient array can be efficiently coded with a run-length encoder, if the coefficients are first reordered to group coefficient subbands with similar expected bit-level run-length statistics together.

Thus, in one aspect of the present invention, a method for compressing a digital image is disclosed. This method comprises wavelet transforming a block of data from a digital image, thereby generating a multiple-subband transform coefficient array. The coefficients of the transform coefficient array are then reordered so as to group coefficient subbands with similar expected bit-level run-length statistics together. The reordered coefficients are then coded using an embedded run-length encoder.

In another aspect of the present invention, a method for storing and retrieving reference frames in a digital video decoder is disclosed. This method comprises the steps of dividing each reference frame to be stored into a group of compression blocks, and storing a wavelet-transformed and embedded run-length coded version of each compression block in a compressed block memory. The method also entails the step of retrieving a specified compression block by run-length embedded decoding and inverse wavelet transforming the version of that block stored in the compressed block memory, when that compression block is needed by the decoder.

In yet another aspect of the present invention, a digital video decoder having a reference frame storage and retrieval subsystem is disclosed. The reference frame storage and retrieval subsystem comprises a compressed block memory, and a compressor for block-wise compressing reference frame information into the compressed block memory. The compressor stores reference frame information from a given block of a reference frame in a wavelet-transformed, embedded run-length coded format. The subsystem further comprises a decompressor for block-wise decompressing reference frame information out of the compressed block memory as needed by the decoder.

BRIEF DESCRIPTION OF THE DRAWING

The invention may be best understood by reading the disclosure with reference to the drawing, wherein:

FIG. 11 illustrates a further method of using compressed frame memory,

DETAILED DESCRIPTION OF THE PREFERRED EMBODIMENTS

The preferred embodiments disclosed below were selected by way of illustration and not by way of limitation. Indeed, many minor variations to the disclosed embodiments may be appropriate for a specific actual implementation.

Figure 1:
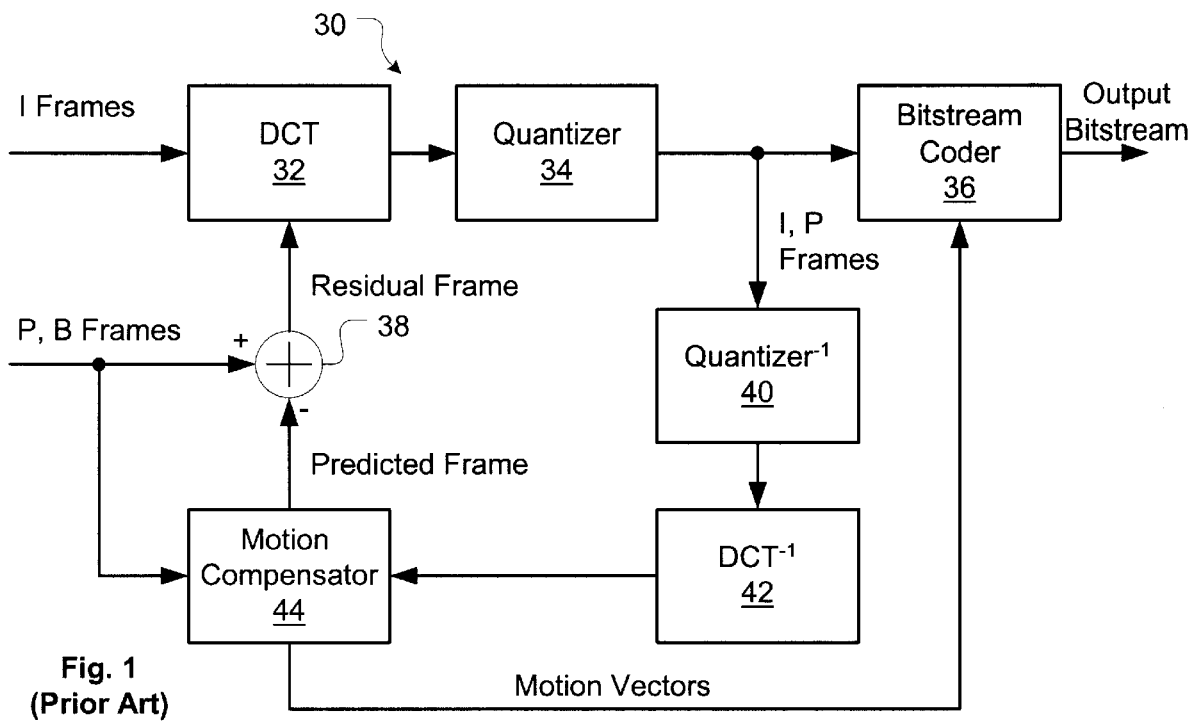
FIG. 1 shows a prior art MPEG video coder.

As an introduction, FIG. 1 shows the general architecture for an MPEG-like video coder 30. An input image stream is divided into I, P, and B frames for input to the system. I (intracoded) frames are directly coded, and P (predicted) and B (bidirectionally predicted) frames are partially indirectly coded (i.e., intercoded) using information from other frames. An operator may select the frequency of I, P, and B frames in the image sequence, with the restriction that at least some I frames must be used. An I frame and its dependent P and B frames are generally referred to as a group of pictures (GOP).

Figure 2:
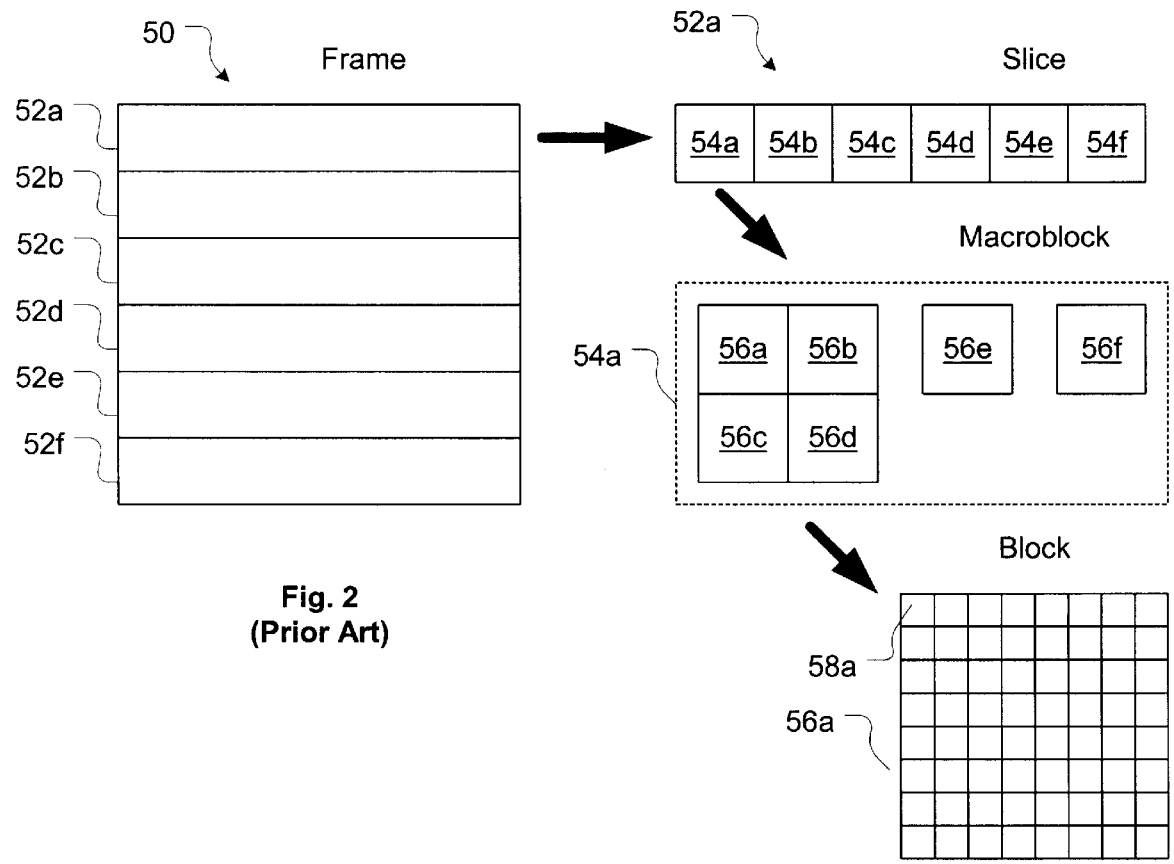
FIG. 2 shows data organization for an MPEG video frame.

DCT 32 operates on 8×8 pixel blocks of an input image (see FIG. 2). At the input to DCT 32, image 50 is divided into horizontal slices 52*a–f* (the number of slices shown is chosen for illustration, and is not fixed in general) for processing. For the luma component of a color image, each slice is 16 pixels high. The corresponding chroma components of the image are commonly sampled at half the spatial frequency of the luma component, such that a chroma slice is 8 pixels high. Each slice (see slice 52*a*) is further partitioned into macroblocks 54*a–f* (the number of macroblocks shown is chosen for illustration, and is not fixed in general). Each macroblock contains six locks (e.g., blocks 56*a–f*), such that the first four blocks 56*a–d* together cover a 16×16 pixel area from the luma component of the current slice, and the fifth and sixth blocks 56*e* and 56*f* cover corresponding 8×8 areas taken respectively from the two chroma components of the slice.

DCT 32 performs a two-dimensional discrete cosine transform on each 8×8 pixel block to produce a corresponding 8×8 block of transform coefficients. Quantizer 34 of FIG. 1 scales the coefficients to a scale commensurate with their range of values. Bitstream coder 36 typically utilizes variable-length entropy coding to losslessly compress the quantized coefficients. The bitstream output of bitstream coder 36 comprises a block-by-block coding as described, with headers inserted at the macroblock, slice, frame, and group of pictures level.

At the video frame input to coder 30, the group of pictures sequence is used to determine whether the next incoming frame will be an I, P, or B frame. I frames are input directly to DCT 32. P and B frames are not input directly to DCT 32, but instead go through a prediction channel that attempts to exploit the temporal redundancies found in most video sequences.

Motion compensator 44 attempts to match the blocks of a P or B frame with the blocks of a prediction frame or frames. For instance, the first P frame following an I frame is predicted from that I frame. The quantized I frame appearing at the output of quantizer 34 is "decoded" by an inverse quantizer 40 and an inverse DCT 42 to represent the I frame as it will be seen by a decoder operating on the bitstream output of coder 30. Motion compensator 44 attempts to find a best fit prediction for each macroblock of the P frame, based on the quantized prediction frame produced by inverse DCT 42. The offset from the P frame macroblock location to the prediction frame location with the best fit is described by a motion vector. In some cases (such as where a new object is introduced to the scene) prediction can be poor, and motion compensator 44 opts not to predict that macroblock, but to let it be intracoded like an I frame instead.

Motion compensator 44 produces two outputs for each input P or B frame: a set of motion vectors and a predicted frame. The motion vectors are supplied to bitstream coder 36 for output coding. The predicted frame is subtracted from the input P or B frame in image adder 38 to form a residual frame. The residual frame is then input to DCT 32 in the same manner as an I frame.

Figure 3:
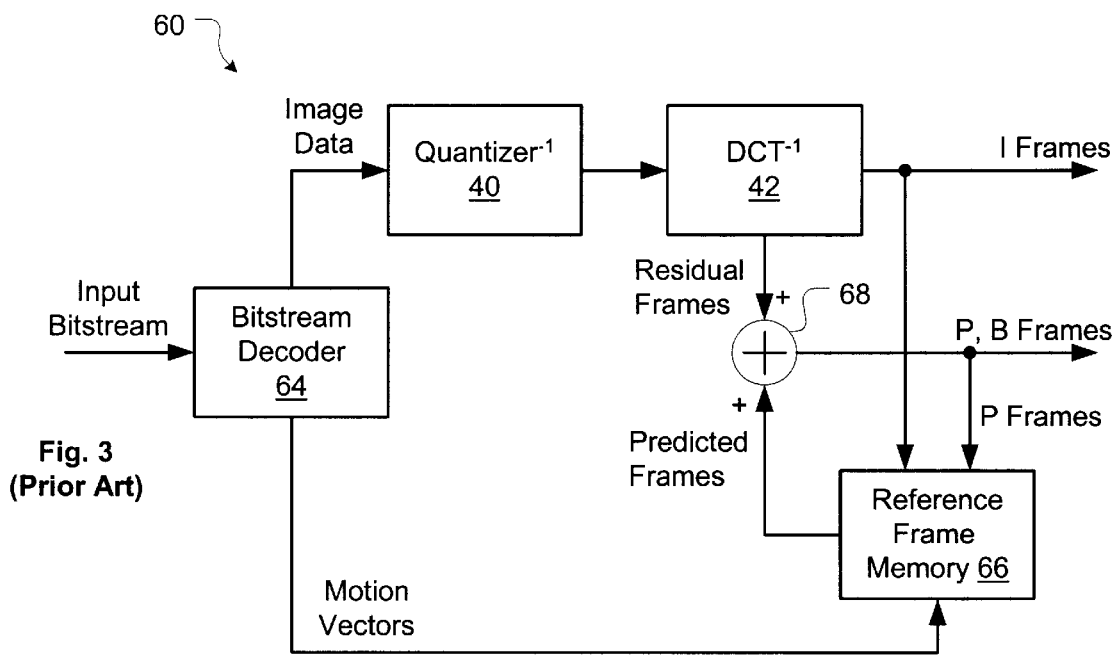
FIGS. 3 and 4 illustrate prior art MPEG video decoders.

FIG. 3 shows a video decoder 60 appropriate for decoding a bitstream produced by video coder 30. A bitstream decoder 64 recovers the transform coefficient and motion vector information from the coded bitstream. The transform coefficient information is passed through inverse quantizer 40 and inverse DCT 42. The I frames are fully reconstructed at this point, and can be output, as well as stored in reference frame memory 66. Reference frame memory 66 reconstructs predicted frames using the motion vector information and appropriate I and P frame data. Image adder 68 combines predicted frames with residual frames to reconstruct P and B frames.

Figure 4:
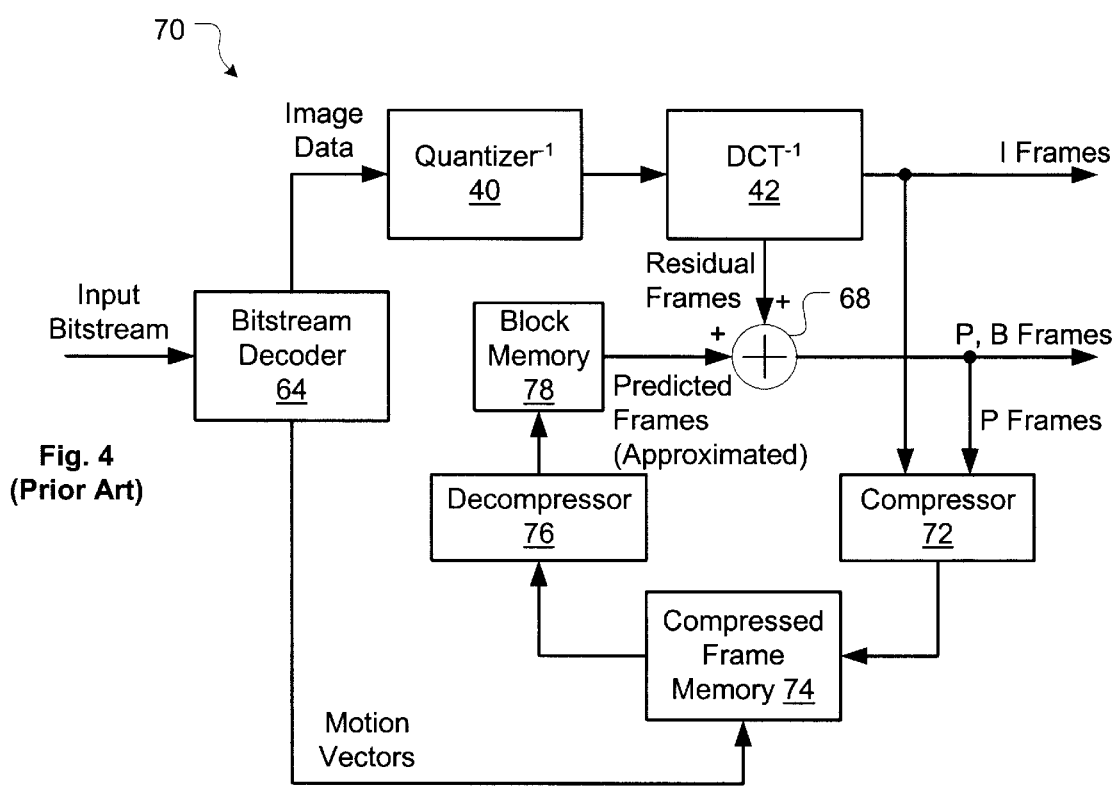

In order to reduce the size of reference frame memory 66, several researchers have proposed some variation on decoder 70 of FIG. 4. Three blocks were added, i.e., a compressor 72, a decompressor 76, and block memory 78 (whose size can be as small as a motion compensation block). Compressed frame memory 74 is then designed to be significantly smaller than the original reference frame memory 66 of FIG. 3.

In operation, compressor 72 operates on reference frames block-wise, each block being compressed to a corresponding compressed block occupying a fixed number of bits or less. Thus, decompressor 76 can easily retrieve the compressed blocks needed for motion compensation specified by the motion vector. Decompressor 76 decompresses the compressed blocks, as needed, into block memory 78.

Ideally, lossless compression would be selected for decoder 70. However, the amount of memory reduction needed to justify the approach usually makes lossless compression infeasible. The present invention has some lossless aspects—if a block can be compressed to fit within its allocated memory space without loss, it will be stored losslessly without further effort. More importantly, the present invention stores block information roughly in order of importance, image quality-wise, such that when the allocated memory space is full, the most important block information has already been preserved. Typically, the present invention can achieve high quality compression with target compression ratios from 2:1 to 8:1. This approach gives a possible tradeoff between quality and memory size—for many applications, there is a tradeoff point where the resulting quality degradation is invisible or acceptable, but the resulting memory reduction is significant.

Figures 5, 6:
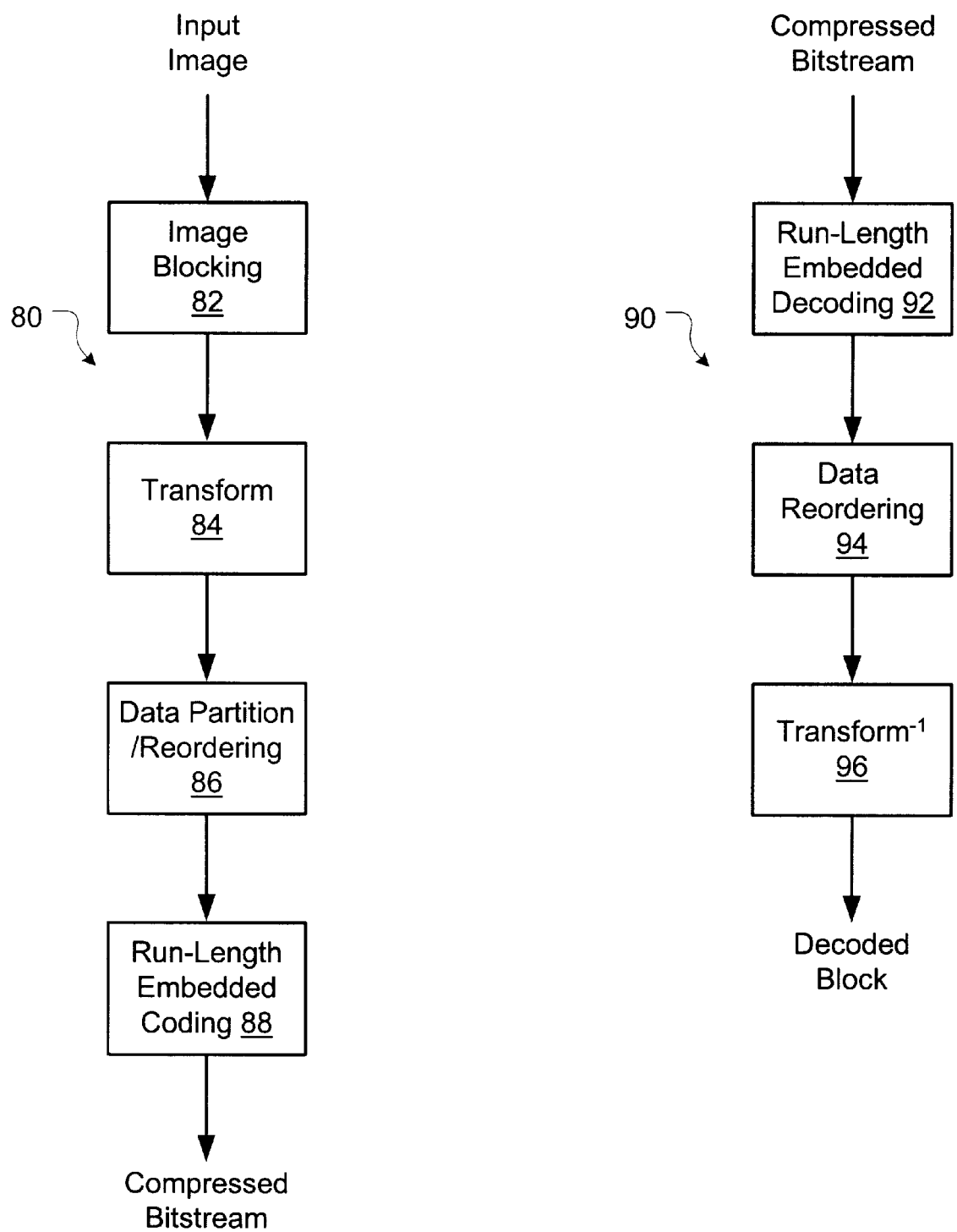
FIGS. 5 and 6 show, respectively, simplified block diagrams for an image compressor and an image decompressor according to the invention.

FIGS. 5 and 6 show, respectively, general block diagrams for a fast compressor 80 and a fast decompressor 90 according to the invention. In a decoder according to the invention, fast compressor 80 replaces prior art compressor 72, and fast decompressor 90 replaces decompressor 76. In fast compressor 80, the four steps required for compression are image blocking 82, a transform 84, data partitioning/reordering 86, and run-length embedded coding 88. Decompressor 90 essentially reverses these steps using run-length embedded decoding 92, data reordering 94, and inverse transform 96.

Figure 7:
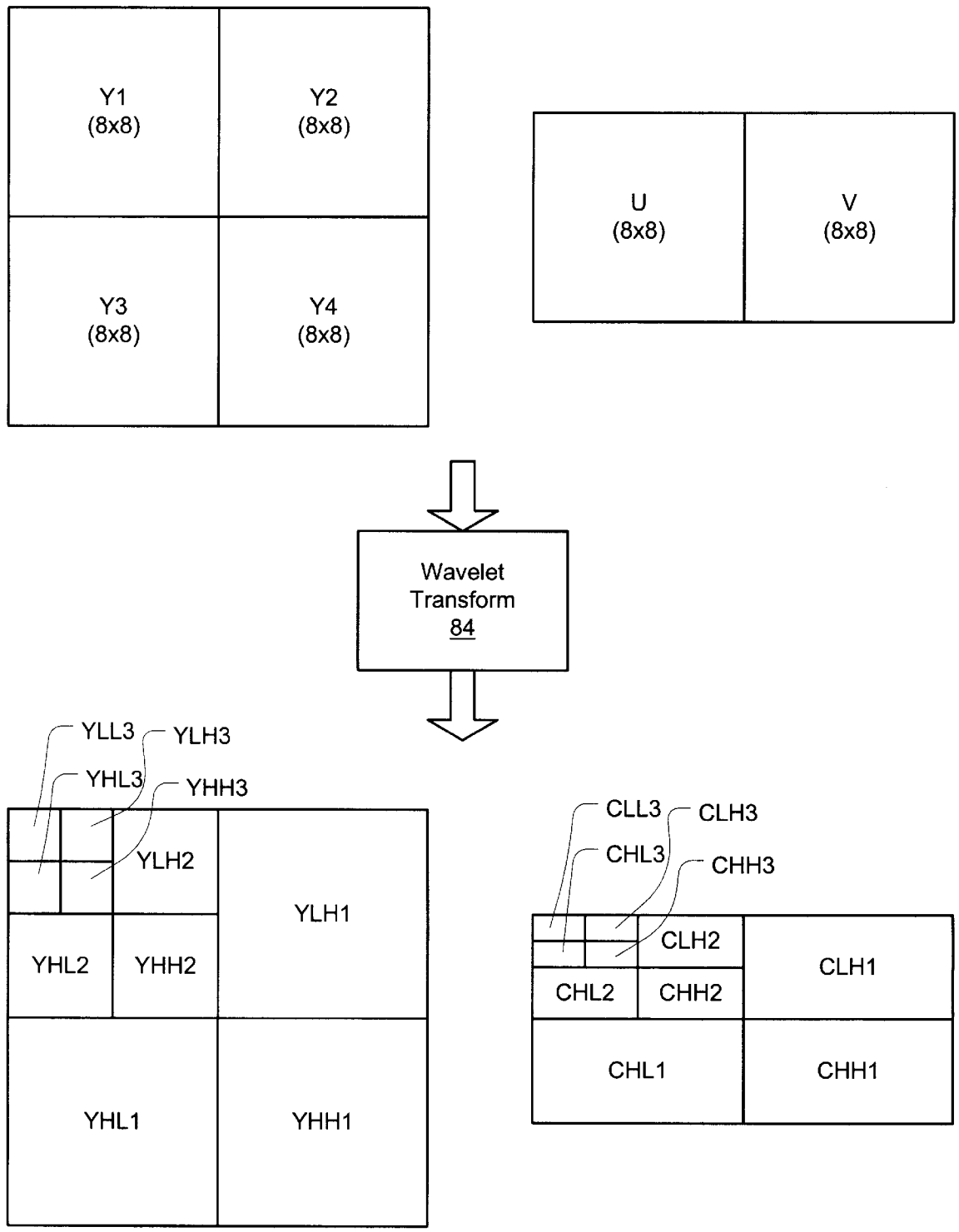
FIG. 7 shows block organization and the corresponding wavelet transform for one preferred embodiment.

The input image to compressor 80 is preferably a group of 8×8 pixel blocks extracted from a reference frame. The preferred compression block size produced by image blocking 82 is a 16×16 luminance (Y) block and two associated 8×8 chrominance (U and V) blocks (assuming 4:1:1 color format), as shown in FIG. 7. This compression block size corresponds to the macroblock structure of most current video coding standards, e.g., H.261, H.263, H.263+, MPEG1, MPEG2, and MDEG4. The decoded compression blocks have the same structure as the input compression blocks.

Transform 84 can be any linear transform, and inverse transform 96 is just its inverse operation. The preferred transform is a wavelet transform with Haar filters, $(1/\sqrt{2}, 1/\sqrt{2})$ and $(1/\sqrt{2}, -1/\sqrt{2})$. One layer of a two-dimensional wavelet transform can be represented by the following equations: For $i=0,1,\ldots,M/2$ and $j=0,1,\ldots,N/2$, where M and N are the width and the height of the image block, respectively, LL: $C(i,j)=[X(2i,2j)+X(2i+1,2j)+X(2i,2j+1)+X(2i+1,2j+1)]/2$ LH: $C(M/2+i,j)=[X(2i,2j)-X(2i+1,2j)+X(2i,2j+1)-X(2i+1,2j+1)]/2$ HL: $C(i,N/2+j)=[X(2i,2j)+X(2i+1,2j)-X(2i,2j+1)-X(2i+1,2j+1)]/2$ HH: $C(M/2+i,N/2+j)=[X(2i,2j)-X(2i+1,2j)-X(2i,2j+1)+X(2i+1,2j+1)]/2$ Multiple layers of a wavelet transform are formed by successive transforms of the LL band. The preferred number of wavelet transform layers is three. FIG. 7 shows a three-layer wavelet transform of the preferred compression block.

The inverse transform is similar to the forward transform. One layer of a two-dimensional inverse wavelet transform can be represented by the following equations:

$X(2i,2j)=[C(i,j)+C(M/2+i,j)+C(i,N/2+j)+C(M/2+i,N/2+j)]/2$ $X(2i+1,2j)=[C(i,j)-C(M/2+i,j)+C(i,N/2+j)-C(M/2+i,N/2+j)]/2$ $X(2i,2j+1)=[C(i,j)+C(M/2+i,j)-C(i,N/2+j)-C(M/2+i,N/2+j)]/2$ $X(2i+1,2j+1)=[C(i,j)-C(M/2+i,j)-C(i,N/2+j)+C(M/2+i,N/2+j)]/2$

In operation, these equations would first be applied, for instance, to bands YLL3, YLH3, YHL3, AND YHH3 to reconstruct a band YLL2. The equations would then be applied to new band YLL2 and bands YLH2, YHL2, and YHH2 to reconstruct a band YLL1. One more iteration reconstructs the original image.

Figure 8:
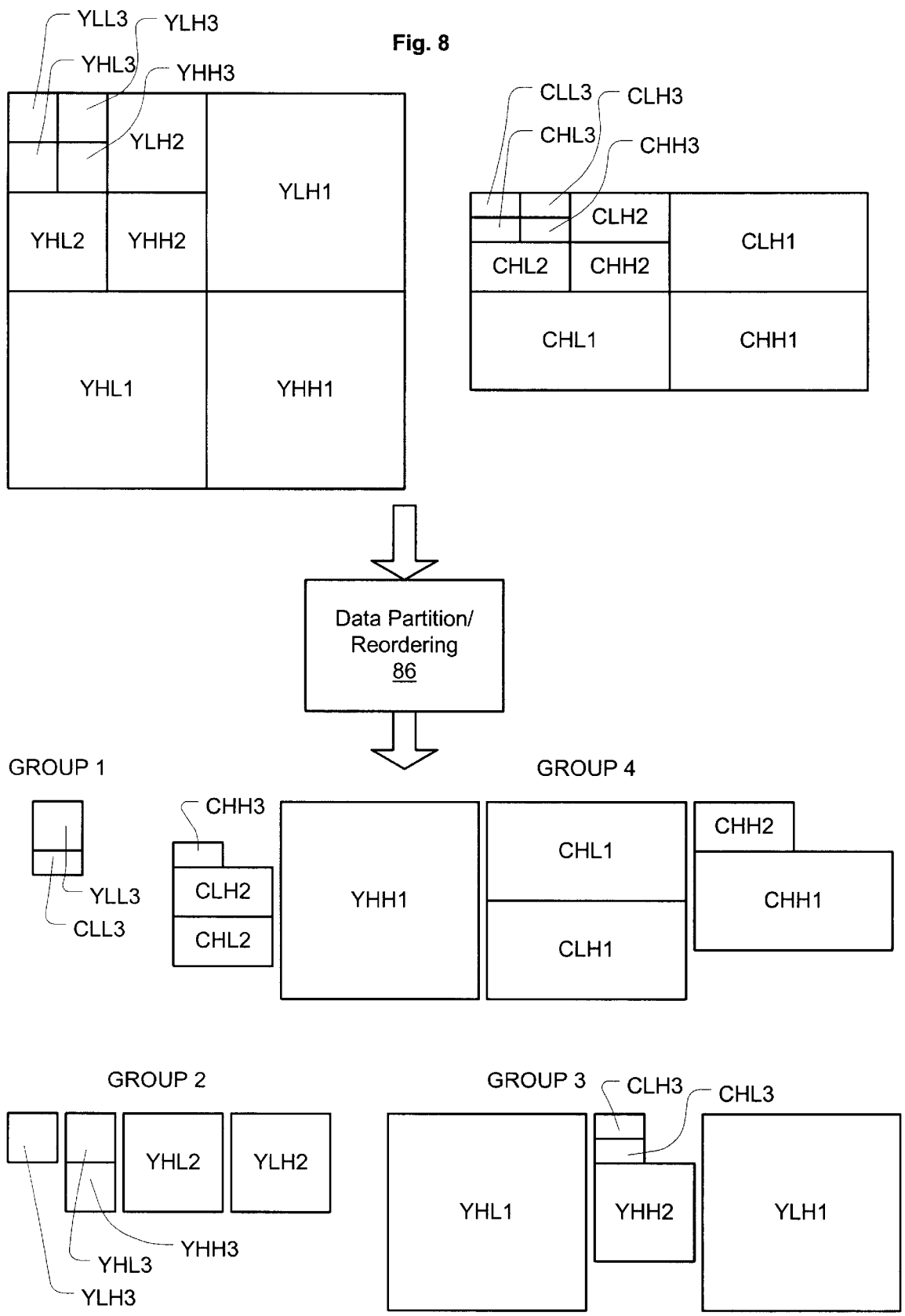
FIG. 8 shows one preferred data partitioning approach for the wavelet transform of FIG. 7.

In order to achieve efficient entropy coding without computational complexity, the transform coefficient array is partitioned into groups and reordered to place coefficients with similar statistics into the same group. The preferred partition is to divide the wavelet subbands into four groups as shown in FIG. 8 and listed as follows:

Group 1 consists of YLL3 and CLL3.

Group 2 consists of YLH3, YHL3, YHH3, YHL2 and YLH2.

Group 3 consists of YHL1, CLH3, CHL3, YHH2 and YLH1.

Group 4 consists of CHH3, CLH2, CHL2, YHH1, CHL1, CLH1, CHH2 and CHH1.

Since the preferred entropy coders process data in a one-dimensional manner, the partitioned subband data is scanned into 1D format. The preferred scan order follows the subband order listed above within each group, row by row from top to bottom within each subband, and from left to right within each row. Note that the reordering and scanning operations need not require physical movement of coefficient values within memory, as some embodiments can implement these steps by appropriate address sequencing.

Data reordering (block 94 of FIG. 6) inverts the above operations, i.e., places the 1D data back into subbands in their proper wavelet transform coefficient array configuration.

After subband grouping, the wavelet-transformed compression block generally remains at full precision. Compression is achieved in the present invention by embedded coding the groups of subbands using a run-length encoder.

Figures 9, 10:
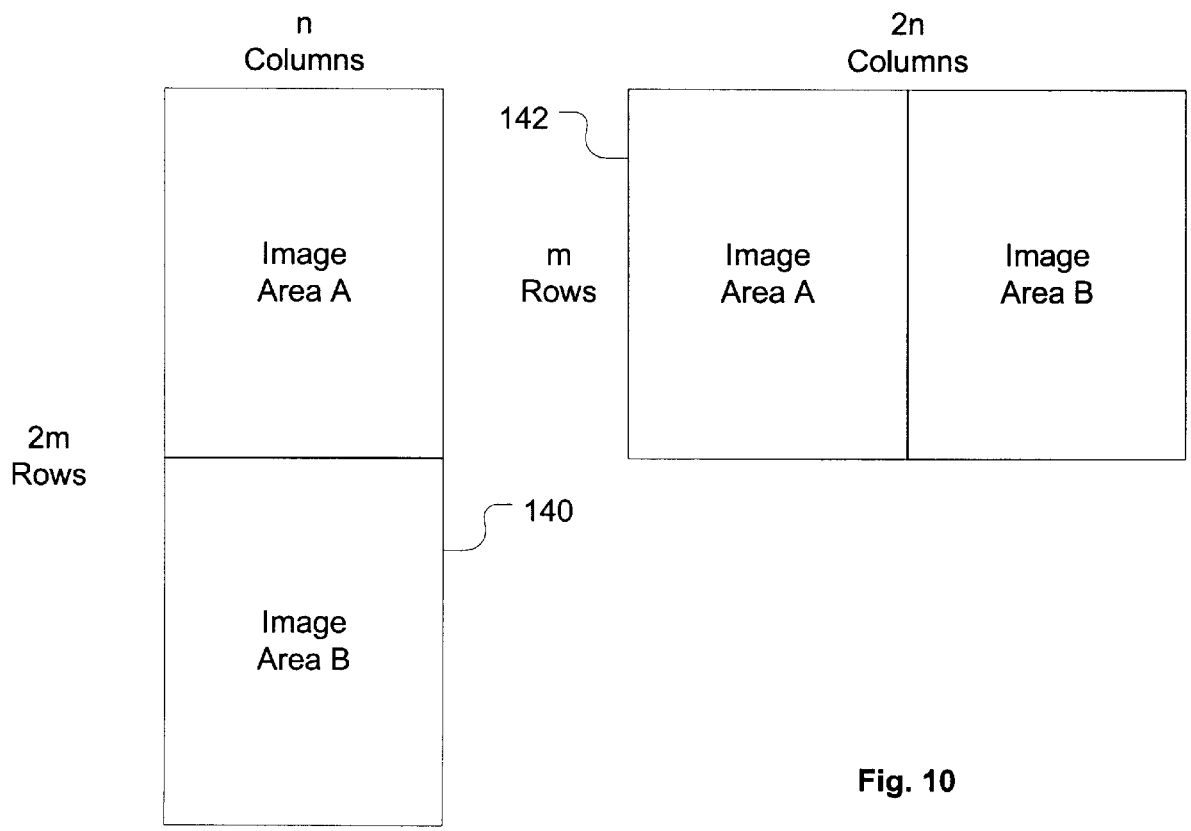
FIG. 9 shows bit classifications for a small set of wavelet transform coefficients.
FIG. 10 shows several configurations for a compressed frame memory useful with the present invention.

Embedded coding differs from standard coefficient coding, both in operation and in effect. As an example, FIG. 9 shows a block of coefficients w0–w7 represented with eight bits per coefficient. In standard coefficient coding, w0, for instance, would be coded first, followed by each coefficient in order. With embedded coding, coding order proceeds by bit-plane rather than by coefficient. For instance, the most significant bit-plane (column b6 of FIG. 9) may be coded first, followed by the second most significant bit-plane b5, and so on. If the coding process must be stopped before all bit-planes have been coded, partial information has been received for each coefficient, whereas with standard coefficient coding, premature termination of the coding process may leave some coefficients completely uncoded. Further, by coding the most significant bit-planes first, an embedded coding order generally minimizes reconstructed image distortion much better than standard coefficient coding order when the coding process is terminated prematurely.

The bits in each coefficient (in sign/magnitude binary representation) can be divided into three categories as shown by the shading in FIG. 9: the sign bit, s, the significance bits, and the refinement bits. The sign bit is obviously the sign of the coefficient. The significance bits are the bits before and including the leading "1" bit of the coefficient, assuming the magnitude bits are ordered from the most significant bit to the least significant bit. The refinement bits are the rest of magnitude bits, other than the significance bits. For example, coefficient wl has a value of "0011101" (a binary representation of 29)—the leading three magnitude bits, "001", are significance bits, and the remaining four magnitude bits are refinement bits.

The preferred embedded coding method codes bits differently based on their category. Statistically, the sign bits and the refinement bits of all coefficients are almost randomly distributed between "0" and "1". Therefore, they are not entropy coded, but are instead stored explicitly in this low-complexity system. On the other hand, the significance bits statistically contain many 0's and very few 1's. The present invention efficiently codes significance bits with low-complexity run-length encoding.

Run-length encoding groups bits into symbols, each symbol representing a "run" in the data of either consecutive 0's or consecutive 1's (typically, runs of 0's are coded). These zero-run symbols can then be efficiently coded using variable-length codes.

Preferably, the present invention run-length encodes significance bits using Golomb-Rice codes—a special subset of Huffman codes. Golomb codes were first introduced in S. W. Golomb, "Run-length Encodings," *IEEE Trans. Information Theory*, vol. IT-12, pp. 399–401, July 1966, for encoding nonnegative run lengths. Given a model parameter m (a positive integer), the Golomb code $G_m$ encodes a nonnegative number n in two parts: a unary representation of the quotient of n/m and a binary representation of the remainder of n/m. For example, the $G_4$ code for n=11 is "00111" where the leading "001" is the unary representation of $2(=\lfloor 11/4 \rfloor)$ and the last two bits "11" are the binary representation of 3 (=11 mod 4).

Rice emphasized the special case of Golomb codes with $m = 2^k$. See M. J. Weinberger et al., "LOCO-I: A Low Complexity, Context-based, Lossless Image Compression Algorithm," *Proc. of the 1996 Data Compression Conference*, Snowbird, Utah, pp. 140–149, March 1996. With an added limitation on m, this method may of course sacrifice some coding efficiency, but the performance degradation is generally minor. Most importantly, the limitation leads to very simple encoding/decoding procedures: the second part of a Golomb code is just the k least significant bits of n. This special kind of code is referred to herein as a Golomb-Rice code $GR_k$.

The combination of zero-run-length symbols and Golomb-Rice codes results in a variable-length-to-variable-length coding procedure—implementable in the present invention with a counter that counts zero runs. During coding with a Golomb-Rice code $GR_k$, when the counter counts $2^k$ 0's, the coder outputs a bit "0". When the zero run length is shorter than $2^k$, the coder outputs a bit "1" and k least significant bits of the binary representation of the zero run length. An example of a run-length/Golomb-Rice code ($GR_k$) with k=3 is shown in Table 1.

TABLE 1

The Input Symbol and Output Code Map for $GR_3$

| Input Symbol | Output Code | Input Symbol | Output Code |
|---|---|---|---|
| 1 | 1000 | 01 | 1001 |
| 001 | 1010 | 0001 | 1011 |
| 00001 | 1100 | 000001 | 1101 |
| 0000001 | 1110 | 00000001 | 1111 |
| 00000000 | 0 | | |

Proper selection of the Golomb-Rice model parameter k is crucial for the best coding efficiency. Assuming each bit of the source is independently and identically distributed (IID) with a probability q of a "0" bit, the optimal $m=2^k$ for Golomb-Rice codes ($GR_k$) satisfies the condition: $q^m \leq \phi < q^{m/2}$, where $\phi = (\sqrt{5}-1)/2$, which is the inverse of the golden ratio.

In the present invention, it is possible to pre-estimate the best k parameters for each group and each bit-plane from some training data. An adaptive parameter selection method is, however, preferable. For instance, a preferred adaptive parameter method uses a one-dimensional array J whose elements consist of non-decreasing values for parameter k. We empirically determined one such J array (with thirteen elements) that performs well with our preferred block sizes:

J[ ]={0,0,0,1,1,2,2,3,4,5,6,7,8}. Each element of the J array is referred to by its index (starting from 0), e.g., J[7]=3.

During operation, the index represents the current state of the Golomb-Rice coder and is denoted by s. The Golomb-Rice coder (or decoder) is initialized with an appropriate k value by choosing the k value's corresponding index in the J array as a starting index s. The coder (decoder) increments the index s by one each time a full zero run (i.e., $2^{J[s]}$ 0's) is encoded (decoded) and decrements s by one when any other symbol is encoded (decoded). Thus the coder generally responds to m-length runs by moving towards larger m, and to sub-m-length runs by moving towards smaller m.

For the four groups shown in FIG. 8, one preferred set of initial k values is 1, 6, 8, and 8, respectively. These initial values are set by initial s indices of 3, 10, 12, and 12, respectively. Note that the indices should be limited at the ends of the J array, i.e., s cannot increment past 12 or decrement past 0 for the preferred J array.

Most embedded coders for wavelet transformed images use complex and/or recursive operations to achieve compression. Erik Ordentlich et al., in "A Low-Complexity Modeling Approach for Embedded Coding of Wavelet Coefficients," *Proc. of the 1998 Data Compression Conference*, Snowbird, Utah, March 1998, used Golomb run-length coding in conjunction with a wavelet transform. Although the Golomb code concept itself is not complex, the Ordentlich et al. approach to compression is relatively complex. Ordentlich et al. apply a bi-orthogonal wavelet transform to an entire image. This context-based approach then requires that the eight neighbors of each wavelet coefficient, the parent of the coefficient, and the higher-order bits for each of these coefficients be examined at each bit-plane in order to classify the bit-plane into "subsequences". The coefficients belonging to each subsequence are coded with a Golomb coder. And the Golomb code parameter is adapted on the fly by measuring statistics of the subsequences during coding.

The preferred embodiment of the invention as described thus far presents a much less complex application of a wavelet transform and run-length coding to image compression. The employed wavelet transform requires only add and shift operations, and is orthogonal. No contextual knowledge (other than whether the present bit is significant) is required. The scan arrangement is by-subband raster scanning. The Golomb code parameter is determined without statistical estimation. And importantly, the present invention performs well with small, block-sized wavelet transforms, as well as with full-sized images.

The following description and pseudocode illustrates one preferred implementation of run-length embedded coding 88 (see FIG. 5) according to the invention. The encoding procedure proceeds bit-plane by bit-plane starting from the most significant bit-plane. Within each bit-plane, the four groups of coefficients shown in FIG. 8 are coded in order, from Group 1 to Group 4.

Within each group on a particular bit-plane, there are two scans of the bit-plane. In the first scan, the significance identifier bits are run-length/Golomb-Rice coded. The sign bit of a coefficient that becomes significant on that bit plane is sent explicitly right after its significance identifier bit, which should be "1", is coded. A transform coefficient is said to be significant if and only if its absolute value is greater than or equal to the value of the currently scanned bit plane. Thus, every Golomb-Rice codeword, except the codeword "0" for the full length runs, is followed by a sign bit. In the second scan, the refinement bits (whose coefficients already became significant on a previous bit-plane) are sent explicitly.

The encoding procedure is stopped when the specified number of coded bits is reached, or when all the coefficients are losslessly coded, whichever comes first. The following steps provide an implementation:

```
0) Initialize the state of the J array for each group, s(i).
1) For each bit-plane, starting from the most significant bit-plane,
2)   For each group, i,
3)     Significance identifier scan: counter=0; for each significance
           identifier bit,
3.1)       If the significance identifier bit is "0",
               counter = counter+1;
               If counter equals $2^{s(i)}$,
                   output a bit "0";
                   s(i) = s(i)+1;
                   counter=0.
3.2)       If the significance identifier bit is "1",
               output a bit "1";
               output the least significant s(i) bits of the
                   counter;
               output the sign bit of the coefficient;
               s(i) = s(i)−1;
               counter=0.
4)     At the end of the significance identifier scan,
           if counter>0, output a bit "0".
5)     Refinement scan: for each refinement bit, output the bit.
```

The following description and pseudocode illustrates one preferred implementation of run-length embedded decoding 92 (see FIG. 6) according to the invention. The decoding is stopped when the specified number of coded bits have been read or when all the coefficients have been losslessly decoded, whichever comes first.

```
0) Initialize the state of the J array for each group, s(i).
   Initialize each coefficient, $C_1$, to zero.
1) For each bit-plane, $2^n$, starting from the most significant bit-plane,
2)   For each group, i,
         counter=0;
         new_significance=False.
3)     Significance identifier scan: for each coefficient, $C_1$, in the
           significance identifier mode,
3.0)       If counter=0 AND new_significance=False,
               Input next bit, b;
3.1)       If b="0", counter=$2^{s(i)}$.
3.2)       If b="1",
               new_significance=True;
               counter = input next s(i) bits;
               s(i) = s(i)−1.
4)     If counter=0 AND new_significance=True,
           $C_1$ =1.5 · $2^n$;
           Input the next bit, b;
           If b=1, $C_1$ = −$C_1$;
           new_significance=False.
         Else
           counter = counter −1;
           If counter=0 AND new_significance=False,
               s(i) = s(i)+1.
5)     Refinement scan: for each coefficient, $C_1$, in refinement mode,
           Input the next bit, b;
           $C_1$ = Sign($C_1$) · (|$C_1$|−$(-1)^b$ · $2^{n-1}$).
```

It can be appreciated from the foregoing description that the present invention is extremely straightforward, requiring no complex decisions or operations. As such, it is particularly suited for block-based fast compression and decompression as needed in an interframe video decoder.

The present invention can be used advantageously with a variety of configurations for a compressed memory. FIG. 10 shows two possible memory configurations. Configuration 140 partitions a compressed memory space into 2m "rows" and n "columns", where reference images are divided into m blocks for compression, and a fixed block size of n bits is allocated for storage of each compressed block. As a first image is received and compression begins, its first compressed block is written into the first row of Image Area A, until either all bits are coded or n compressed bits have been created. The second compressed block is written into the row immediately below it, and so on, until the top half of configuration 140 holds the first image. When the second image arrives, its blocks are likewise compressed into Image Area B.

Alternately, memory configuration 142 has only m rows but 2n columns. Image Area A and Image Area B are side-by-side, such that, physically, blocks from Area A are interleaved with blocks from Area B. The first block of the first image is written in the first compressed block space, and the second block of the first image is written to the third compressed block space. When the second image arrives, its first block is written into the second compressed block space.

A configuration like memory configuration 142 has particular advantages when used with the embedded coding of the present invention. FIG. 11 shows a reconfigurable memory 144 at four times T0–T3, corresponding to the arrival of four consecutive compressed reference frames Frame 0–Frame 3. Prior to time T0, memory 144 is empty. Frame 0 is therefore allowed to compress each block into two consecutive compressed block spaces, if necessary (as pictured, some compressed blocks may not require the entire two block spaces). At time T1, blocks from Frame 1 begin to arrive. The compressed blocks from Frame 1 are allowed to overwrite an end portion of the corresponding blocks from Frame 0, truncating Frame 0 and effecting a higher compression rate for that frame. Because the code is embedded, it can be truncated in this manner while saving the most important block information, without further concern (although the decoding algorithm must recognize the size change of the data block).

At time T2, Frame 2 arrives and is allowed to overwrite an end portion of Frame 1, truncating it likewise. Note that Frame 2 also "wraps" to overwrite the truncated Frame 0. Finally, at time T3, Frame 3 overwrites the end portion of Frame 2 as well as the truncated Frame 1.

When operating in this truncation mode, the present invention can provide even lower drift and improved PSNR. This effect stems from the storage of more recent reference frames at lower compression than older reference frames. Since errors (and therefore drift) propagate forward from the latest reference frame, storing this frame at lower compression improves performance as compared to an equal allocation of memory between the two frames. Note, however, that it is preferable that blocks from an earlier frame not be truncated before they are used to construct the later reference frame (if so used). This may require some attention to the method of truncation, e.g., some block data from the new frame may initially be written to the stale frame memory segment, and then copied so as to truncate the older current frame blocks after those blocks have been used to create the newer current frame.

Three methods were used to compress a frame from the "queen" sequence macro-block by macro-block (16×16 pixel blocks for Y and 8×8 blocks for U and V). The first method is the SPIHT algorithm as used in parent application Ser. No. 08/975,922. The second method is quad-tree embedded coding, as disclosed in S. Lei and J. Li, "A Quad-tree Embedded Image Compression and Decompression Method and Apparatus," U.S. patent application Ser. No. 09/209,318, filed Dec. 9, 1998. The third method is run-length/embedded coding as described above. The PSNR performance of these three methods at three compression ratios is shown in Table 2. From the table, it is apparent that the coding efficiency of the run-length/Golomb-Rice embedded coding is slightly better than SPIHT and quad-tree embedded coding at compression ratios of 6:1 and 8:1, but slightly worse at a compression ratio of 4:1. However, the complexity of the run-length/Golomb-Rice coding is much lower than the other two methods and much more suitable for hardware implementation.

TABLE 2

PSNR Performance Comparisons

| Compression Ratio | 4:1 | 6:1 | 8:1 |
|---|---|---|---|
| SPIHT | 39.99 dB | 35.30 dB | 32.72 dB |
| Quad-Tree Embedded Coding | 39.93 dB | 35.46 dB | 32.98 dB |
| Run-Length/Golomb-Rice Embedded Coding | 39.77 dB | 35.52 dB | 33.14 dB |

The compression/decompression system presented in this disclosure can be used as one component of a complete video transmission or storage system. Minor modifications to the disclosed embodiments may be appropriate in some circumstances. For instance, it may be preferable to code some groups (i.e., group 1) without run-length encoding, or to code more bits planes of one group before an equal number of bit planes from another group has been coded. Likewise, refinement bit coding need not directly follow significance coding for each group and bit plane, with several alternative coding priorities being possible. The Haar transform and Golomb-Rice coding are preferred for their simplicity, although the system can function with more complex equivalents. The grouping of subbands is designed to group coefficients expected to have similar statistics; as such, many alternative groupings may be appropriate and workable.

Although fixed-length compressed block space has been described, variable-length compressed block spaces are also envisioned. For instance, if a block does not use all of it allocated space to reach a given coding level, that space may be used by other blocks that require more space to reach the same coding level. Note also that with a closed GOP format (one where an I-frame is not referred to by previous B-frames), each new I frame may overwrite the entire compressed block memory.

The size of the compression block is a design parameter. The larger the compression block, usually the more efficient the compression algorithm becomes, but more pixels outside of the motion compensation block need to be decoded, i.e., more computations. A suitable block size has to be chosen by compromising between these two factors. The preferred block size is a 16×16 luminance (Y) block and two associated 8×8 chrominance (U and V) blocks, corresponding to the macro-block structure of most current video coding standards, e.g., H.261, H.263, H.263+, MPEG1, MPEG2, and MPEG4. A further advantage of the orthogonal wavelet transform used in the preferred embodiment is that a block need not be completely decompressed if only a portion of it is needed for the current prediction block. Thus the present invention can retrieve each needed prediction block in roughly the same amount of time (after Golomb/Rice decoding), even if the prediction block overlaps four compressed blocks.

The block memory may store the motion compensation prediction block only in an implementation. Alternately, the prediction block memory can be made large enough to store each overlapping compression block after decompression. This group of blocks usually covers an area larger than a motion compensation block because the compression blocks may not align with the motion compensation block. Because the next motion compensation block is very likely partially covered by the decompressed blocks already, the computations for decompression may be reduced.

One of ordinary skill in the art will recognize that the concepts taught herein can be tailored to a particular application in many advantageous ways. Such minor modifications are encompassed within the invention, and are intended to fall within the scope of the claims.

What is claimed is:

1. A method for compressing a digital image, the method comprising the steps of:
    linear transforming a block of data from a digital image, representing a subset of the digital image, thereby generating a transform coefficient array having multiple subbands;
    reordering the coefficients of the transform coefficient array to group coefficient subbands with similar expected bit-level run-length statistics together; and
    embedded coding the reordered coefficients using a run-length encoder.

2. The method of claim 1, wherein the linear transforming step uses a two-dimensional Haar wavelet transform.

3. The method of claim 1, wherein the block of data is selected to be equivalent to the size of a motion compensation block of the digital image.

4. The method of claim 1, wherein the embedded coding step comprises:
    for each bit plane of the reordered coefficients, rnm-length encoding the significance bits of the bit plane, and explicitly coding the refinement bits of the bit plane; and
    explicitly coding the sign bit of a coefficient at the time the coefficient becomes significant.

5. The method of claim 1, wherein the embedded coding step is halted at a predetermined bit rate.

6. The method of claim 1, wherein the run-length encoding step uses Golomb codes.

7. The method of claim 1, wherein the run-length encoding step uses Golomb-Rice codes.

8. The method of claim 1, wherein reordering the coefficients of the transform coefficient array comprises creating first and second groups of coefficients.

9. The method of claim 8, wherein the significance bits for the first group of coefficients are Golomb-Rice coded using a first model parameter, and the significance bits for the second group of coefficients are Golomb-Rice coded using a second model parameter.

10. The method of claim 9, wherein the first model parameter is adaptive.

11. The method of claim 9, wherein the first and second model parameters are independently adaptive.

12. The method of claim 11, wherein each parameter adapts by the step of looking up parameter values from a sequence stored in a look-up table.

13. The method of claim 8, wherein the significance bits for a bit-plane of the first and second groups of coefficients are both coded prior to the coding of the refinement bits for the same bit-plane of the first and second groups of coefficients.

14. The method of claim 8, wherein the refinement bits for a bit-plane of the first group of coefficients are coded prior to the coding of the significance bits for the same bit-plane of the second group of coefficients.

15. The method of claim 8, wherein the significance bits for the first two bit-planes of the first group of coefficients are coded prior to the coding of the significance bits for the first bit-plane of the second group of coefficients.

16. The method of claim 1, further comprising:
dividing the digital image into a regular group of sub image blocks;
performing the linear transforming, reordering, and embedded coding steps on each subimage block; and
storing the embedded code for each block in a memory.

17. The method of claim 16, wherein a fixed block size is allocated in the memory for storing the embedded code for each block.

18. The method of claim 16, wherein a variable block size is allocated in the memory for storing the embedded code for each block.

19. A method for storing and retrieving reference frames in a digital video decoder, the method comprising the steps of:
dividing each reference frame to be stored into a group of compression blocks;
storing a linear-transformed and embedded run-length coded version of each compression block in a compressed block memory; and
retrieving a specified compression block as needed by the decoder by run-length embedded decoding and inverse linear transforming the version of that block stored in the compressed block memory.

20. The method of claim 19, wherein the linear transform used in the storing a linear-transformed and embedded run-length coded version step comprises a Haar wavelet transform.

21. The method of claim 19, wherein when only a segment of a specified compression block is needed, the retrieving step performs the inverse linear transforming step only on the portion of the linear transformed version corresponding to that segment.

22. The method of claim 21, wherein the linear transform used in the storing a linear-transformed and embedded run-length coded version step comprises a Haar wavelet transform.

23. A digital video decoder having a reference frame storage and retrieval subsystem comprising:
a compressed block memory;
a compressor for block-wise compressing reference frame information into the compressed block memory, the compressor storing reference frame information from a given block of a reference frame in a linear-transformed, embedded run-length coded format; and
a decompressor for block-wise decompressing reference frame information out of the compressed block memory as needed by the decoder.

24. The digital video decoder of claim 23, wherein the linear transform used by the compressor is a Haar wavelet transform.

* * * * *